United States Patent [19]

Pujari et al.

[11] Patent Number: 5,229,339
[45] Date of Patent: Jul. 20, 1993

[54] PRESSURE CASTING CERAMIC SLURRIES

[75] Inventors: Vimal K. Pujari, Northborough; Craig A. Willkens, Sterling; Ajay K. Garg, Northborough, all of Mass.

[73] Assignee: Norton Company, Worcester, Mass.

[21] Appl. No.: 792,330

[22] Filed: Nov. 12, 1991

[51] Int. Cl.$^5$ .............................................. C04B 35/04
[52] U.S. Cl. ...................................... 501/96; 501/97; 501/98
[58] Field of Search ................... 264/7, 8; 501/88, 92, 501/96, 97, 98

[56] References Cited

U.S. PATENT DOCUMENTS

| | | | |
|---|---|---|---|
| 4,834,928 | 5/1989 | Su | 264/56 |
| 5,047,181 | 9/1991 | Occhionero et al. | 264/28 |

*Primary Examiner*—Mark L. Bell
*Assistant Examiner*—A. Wright
*Attorney, Agent, or Firm*—Thomas DiMauro

[57] ABSTRACT

Aqueous suspensions of ceramic particles in which the particle are coated by a metal oxide sintering aid or metal hydroxide precursor thereto and which have a sufficiently high solids content to produce casting slips which can yield net shape castings are provided. The suspensions are produced by concentrating lower solids content suspensions by crossflow filtration which disrupts hydroxide gels which inherently form by interaction of the coating with water. The resultant highly loaded aqueous suspensions may be used in net shape casting to produce cast bodies of high dimensional stability, high green strength, and with a low incidence of cracking.

19 Claims, No Drawings

PRESSURE CASTING CERAMIC SLURRIES

TECHNICAL FIELD

This invention relates to the pressure casting of ceramic components using aqueous suspensions of sintering aid coated ceramic powders. More particularly, the invention relates to a process for preparing casting slips of sintering aid oxide precursor hydroxide coated ceramic particles at a sufficiently high solids loading that net shape castings free from drying cracks can be produced from the slips. When the sintering aid oxide precursor hydroxide coated particles were used to prepare casting slips at conventional solids loadings of about 50–55 wt%, hydroxide gels formed between particles which prevented the production of crack-free castings. Moreover, such powder loadings are generally too low to produce net shape castings. This invention relates to a process for disrupting the gels formed by such sintering aid oxide precursor hydroxides to permit casting slip solids loadings above about 70 wt.% which permit the preparation of net shape castings free from cracks from the coated ceramic powders. Furthermore, the cast bodies so produced exhibit unusually high green strengths.

TECHNICAL BACKGROUND

Slip casting, a standard manufacturing procedure used in the manufacture of ceramic products, entails adding a fluid suspension of a ceramic powder, a slip, to a mold constructed of a porous material such as plaster. The fluid migrates into and through the walls of the mold leaving a ceramic powder deposit on the interior wall of the mold. The deposition of the powder on the interior surface of the mold is often facilitated by spinning the mold (centrifugal casting) or by applying pressure to the slip while it is in the mold (pressure casting). Thereafter excess suspension is poured off and the mold removed to produce a green body. Subsequently the green body is dried in a controlled temperature and humidity environment before being subjected to a heat, and usually pressure, treatment such as sintering, hot isostatic pressing, or the like, to substantially fully densify the ceramic powder and increase its strength.

It is known that bodies cast from more highly loaded powder suspensions are more likely to produce net shape castings free from drying cracks. In a net shape casting process, the casting is generally made using only one slip addition to a mold which is essentially the final shape and size of the desired body so that it requires little or no final machining to be ready for use. As a result, net shape castings are characterized by lower drying shrinkage, lessened tendency to warp and crack, and improved dimensional control. Ceramic powder suspensions which contain powder loadings greater than about 70 wt. % are regarded as highly loaded.

Sintering aid oxides such as yttria, magnesia, and the like, are often incorporated with ceramic powders to facilitate the densification process. Generally such sintering aids are added to a ceramic powder during a milling or comminution procedure which reduces the particle size of each and attempts to uniformly mix them. However, it has been found that the desired uniformity of such a mixture is usually less than ideal. As a result, a process was developed to coat such sintering aid metal oxides, or more accurately precursor hydroxides thereto which are readily converted to oxides by the application of heat, onto the surfaces of ceramic partricles. U.S. Pat. Applns. Ser. No. 07/288,208, filed Dec. 22, 1988, now abandoned, and Ser. No. 07/450,200, filed Dec. 13, 1989, the subject matters of which are incorporated herein by reference, disclose inter alia methods for coating the surfaces of a ceramic powder with a solid sintering aid oxide or hydroxide precursor thereto while the powder is dispersed in water. Basically, the method entails controllably precipitating a metal hydroxide or oxide onto the surfaces of an inorganic ceramic particle while substantially avoiding the generation of free sintering aid oxide or hydroxide particles. For example, yttrium hydroxide may be selectively precipitated on the surfaces of silicon nitride by controlling the pH of an aqueous suspension of the silicon nitride to generate an increased reactivity at the surface of the particles as compared to in the bulk. Thus, after an aqueous solution of yttrium nitrate is added to an aqueous slurry of milled and filtered silicon nitride particles and the pH adjusted to about 7, aqueous ammonia solution is slowly added until essentially all of the yttrium is precipitated on the silicon nitride as a coating of yttrium hydroxide. The hydroxide coating can be readily converted to an oxide by heating.

The ceramic bodies which have been cast from such sintering aid coated ceramic particles at concentrations of about 20–40 wt % have a low cast density and have exhibited a high incidence of cracking both in the wet and dry states. Attempts at concentrating the lowly loaded sintering aid coated particles to produce net shape castings have been unsuccessful, apparently due to the the same hydroxide linkages which provide the green strength. As such when the low solids compositions have been concentrated by techniques which have been previously used with other ceramic systems, gels have formed which have prevented increasing the solids content of the suspensions to greater than about 55 wt % prior to its use in pressure casting. Thus, the benefit of the high green strength from using sintering aid coated particles has not been made useful in the production of net shape castings due to the gels which form at high solids loading and which prevent flow of the suspension. It was thought, however, that the cross-linking of the hydroxide gel which occurred could be used to provide adequate wet and dry green strengths to yield a crack-free cast body, provided the casting slip could be concentrated to greater than 65 wt % solids loading, preferably greater than 70 wt %.

Examples of filtration techniques which have been used with suspensions of different ceramic powders include: colloidal filtration of $ZrO_2$-toughened alumina from 50 vol % aqueous suspensions; (Konsztowicz et al., Chem. Abs., 113(24):216661r); pressure filtration at 0.3 MPa (Schulle et al., Chem. Abs., 112 (2):10952 g); and a filter to prevent surface defects in slip-cast alumina bodies (Shanefield et al., Chem. Abs. 84(22): 154597w). These previous efforts were not dealing with sintering aid coated ceramic particles and thus did not face the hydroxide gel formation problem which occurs with such particles.

Accordingly, it is an object of this invention to produce aqueous ceramic casting suspensions which are sufficiently highly loaded to yield substantially net shape castings.

More specifically, it is an object of this invention to produce aqueous casting slips containing at least about 65, preferably at least about 70, wt % sintering aid oxide or sintering aid oxide precursor coated ceramic powder which, when pressure cast, yield substantially net shape castings.

SUMMARY OF THE INVENTION

The present invention is directed to methods of increasing the loading of suspensions of sintering aid coated ceramic powders to above about at least 65 wt %. The present invention involves concentrating a low solids aqueous suspension of sintering aid coated ceramic particles by crossflow filtration, a filtration technique which combines shear forces with pressure Crossflow filtration has been found to overcome the concentration-preventing deleterious effects of hydroxide gels which normally form between the sintering aid coated particles when in aqueous suspension, thereby enabling the preparation of casting slips having increased solids contents, preferably sufficiently high solids to be used for net shape casting. The bodies cast from such casting slips exhibit a high green strength and are substantially free from cracking in both the wet and dry state.

Ceramic powders having a coating of a sintering aid or precursor thereto, such as a metal hydroxide or oxide, on the surface thereof may be used to slip cast net shape bodies having high green strength when they are suspended in water at a concentration of about 20–50 wt % and the suspension is then concentrated to at least about 65 wt % by means of crossflow filtration. Optionally, a water soluble binder may be incorporated to further increase the green strength, especially when extremely complex shapes are being cast, for mold removal.

DESCRIPTION OF THE PREFERRED EMBODIMENTS

The present invention is particularly applicable to fine ceramic powders such as carbides and nitrides but preferably inorganic nitrides. They are often prepared by size reduction of larger particles. Such ceramic powders undergo liquid phase densification which is assisted by the presence of one or more sintering aids. Examples of suitable nitrides include silicon nitride, aluminum nitride, boron nitride, and titanium nitride. A method of preparing nitride ceramic particles having a surface coating of sintering aid oxide or precursor thereto in the substantial absence of free sintering aid particles entails (i) comminuting the ceramic material, preferably in water, to a desired fine particle size (for example less than about 2 microns), (ii) adding a metal salt which will generate metal ions of the desired sintering aid to the nitride particles in the form of an aqueous solution, generally after the comminution, and (iii) surface precipitating the metal ions which combine with hydroxyl ions and a metal hydroxide precursor to the desired oxide onto the ceramic particles from the aqueous solutions under conditions which preclude the precipitation of the precursor in the bulk, and finally (iv) converting the precursor to the desired final oxide. The conversion to the final oxide may be delayed until densification of the particles.

U.S. Pat. Applns. Ser. No. 07/288,208, filed Dec. 22, 1988, now abandoned, and Ser. No. 07/450,200, filed Dec. 13, 1989, and PCT published application US89/05838, filed Dec. 19, 1989, disclose such a process and are incorporated herein by reference.

The comminution (milling of the nitride particles to the desired fine particle size) may be performed in a conventional manner in the presence of an alcoholic solvent, such as isopropanol, and then dried to remove the solvent. In this case, the inherent oxide surface that forms upon exposure to air should be removed by acid washing to improve surfactant adhesion. Preferably, however, the milling is performed in the presence of water and a surfactant which is more reactive with the nitride than is the water so that the nitride is protected from attack by the water and thus reaction with the water is substantially prevented. Suitable surfactants useful herein include aminofunctional zircoaluminate surfactants having an inorganic polymer backbone (from Cavedon Chemical, now Manchem), silanes, titanium alkoxides, aluminum alkoxides, zirconium alkoxides, iridium-based surfactants, and the like. Of course, the selected surfactant must not detrimentally effect the performance of the nitride in its intended use. In addition, the surfactant must not generate any substantial amount of foam which could deleteriously effect the comminuting operation. Preferably, an organofunctional zircoaluminate is used. More preferably, the organofunctional groups are selected from amino, mercapto, carboxy, as well as oleophilic groups.

Generally the surfactants useful herein are those which are sufficiently attracted to the ceramic particles to react therewith more rapidly than can water. The surfactant serves to prevent, or at least substantially retard, reaction of the nitride with water. The surfactant is normally used in an amount of about 0.5 to about 10, preferably about 1 to about 5, weight based on the water. The milling is normally conducted for a period of at least about 10 hours, though the time has not been found critical if the desired particle size is achieved.

The comminution of the relatively large ceramic particles to the desired particle size may be performed in any conventional mill or other particle comminution device that operates on the principle of suspending solid particles in a liquid medium. Examples of suitable such devices include vibratory, ball, and attritor mills, and the like.

The sintering/densification aids added to the ceramic include those conventional oxides which are known to be useful for densifying the ceramic material involved. Examples of suitable oxides for nitride ceramics include those of rare earth metals such as yttrium, as well as magnesium, zirconium, aluminum, cerium, hafnium, and mixtures thereof. Preferably the sintering aid is selected from yttria, magnesia and mixtures thereof. Most preferably the sintering aid is yttria. Precursor hydroxides of these sintering aids which can be surface-precipitated are prepared in situ from metal salts which produce metal ions when placed in water. Salts which can generate the desired metal hydroxide precursors include such as yttrium nitrate, yttrium chloride, yttrium acetate, magnesium nitrate, magnesium bromide, magnesium acetate, and mixtures thereof. Most preferably the salt used is the nitrate of the particular metal since the product of neutralization, ammonium nitrate, readily decomposes at low temperatures with no deleterious effect on the ceramic products. The amount of sintering aid used will depend upon its particular efficiency and the use to which the final body will be put, but generally a total amount of about 0.5 to about 10% by weight of the ceramic material is suitable.

To deposit the sintering aid precursor hydroxide on the surfaces of the ceramic particles which have been previously milled, e.g. in alcohol, and dried, the milled particles can be slurried in water with suitable agents to prevent agglomeration and/or undesired reactions, along with the necessary metal salt. To deposit the sintering aid precursor hydroxide in the preferred case where the milling operation is performed in water, the desired metal salt may simply be added to the mill after the milling is completed and, after the milled suspension has been filtered to remove any nitride particles larger than about 2 microns. The slurry may also contain an alcohol in up to about 50 wt % of the water. The deposition of the sintering aid precursor hydroxide upon the milled particles by surface precipitation is then performed by adding the desired metal salt and then slowly increasing the pH of the solution by the addition of a base such as aqueous ammonia.

If two or more sintering aids are desired for a particular ceramic material, they may be deposited from a single solution containing metal ions of each. Preferably, the sintering aids will be deposited in a sequential manner, thereby providing an additional means of controlling the interaction of the materials to obtain optimum densification results and physical properties of the resultant ceramic body.

The ceramic particles having a coating of sintering aid hydroxide precursor may be used directly for the slip casting process of the present invention, i.e. without drying, or they may be dried in any conventional manner to form the sintering aid oxide and added to water to form the initial casting slip which is concentrated.

The coating of a ceramic powder by the metal hydroxide has at least two beneficial effects. It provides a more uniform distribution of sintering aid and, as shown below, it aids in the production of net shape cast bodies having high green strength and resistance to cracking both when wet and dry.

Suspensions of the coated particles at conventional concentrations of about 20-50 wt % may be concentrated to at least about 65 wt %, preferably at least about 70 wt %, more preferably at least about 72 wt %, and most most preferably at least about 74 wt %, by crossflow filtration, a well-known filtration technique which combines a shear force with pressure filtration. Crossflow filtration produces a well disposed stable suspension which does not exhibit a dramatic increase in viscosity, i.e. dilatant behavior, due to the procedure. Generally the concentrated suspensions produced herein exhibit a viscosity of less than about 1,000, preferably less than 750, and more preferably less than about, 250 centipoise as measured with a Brookfield LV-2 viscometer (spindle #2 at 30 rpm).

Unlike centrifugation or other dead end filtration techniques, cross-flow filtration involves a tangential-flow circulation through a filter element which continuously sweeps the filter surface clean. Tangential flow filtration is a pressure driven separation process in which a fluid is pumped parallel to the filter surface. The tangential flow sweeps away debris and prevents clogging of the filter surface. A shear stress develops due to the tangential flow filtration as a result of a deposition of the coated particles on the filter surface which increases drag along the wall.

In crossflow filtration, a process flow stream (slurry) is generally fed into one end of and then circulated through coaxial-flow channels (lumens) of a filter element. A suitable such element is an assymetric alumina ceramic filter element, i.e. Ceraflo ® filter of Norton Company, Worcester, Mass. Under pressure, a suspension of the coated ceramic particles is forced through microporous walls (preferably having pores of about 0.2 μm) of each element and the filtrate fills the shell of a filter housing surrounding the element and from which the liquid is removed. The concentrated suspension is removed from the opposite end of each element. Circulation continues until the desired solids loading is achieved.

Suitable crossflow filtration apparatus, with full recycle of the retentate is described by M. Cheryan in Ultrafiltration Handbook, Technology Publishing Co., Lancaster, Pa., 1986, pp. 210-213, the subject matter of which is incorporated by reference. Such equipment is well known and readily available. The present invention is independent of the specific equipment utilized and thus further description thereof is not provided herein but may be readily found in the literature.

It has been discovered that a sufficiently highly loaded coated ceramic particle suspension useful for producing net shape casting may be successfully formed if the gel-forming sintering aid oxide or hydroxide precursor coated nitride particle suspension is subjected to crossflow filtration. Generally there will be a shear stress at the filtration surface of the slurry of about 40-200 MPa which corresponds to a shear strain of about 15-20. Suitable pressures applied to pump the slurry through the filter will generally be in the range of about 40 to 150 psi, preferably about 50 to 120 psi, more preferably about 55 to 75 psi.

The exact mechanism involved in disruption of the gel structure by the crossflow filtration is not known. It is hypothesized that the gel structure in the ceramic suspensions of this invention are formed of long chains of precipitated metal hydroxide. Such gel is disrupted and possibly fragmented into shorter chain lengths by the combined forces applied, apparently without effecting the shorter chains thought to impart the high green strength characteristics of bodies cast using more dilute slips of the coated ceramic powders. Net shape slip cast bodies made using highly loaded ceramic suspensions have the desirable properties of high green strength, high dimensional stability, and freedom from cracks.

Such highly loaded suspensions, which contain at least about 65, preferably at least about 70, more preferably at least about 72, and most preferably at least about 74 wt % coated nitride ceramic particles, may be used to produce net shape castings resulting in bodies having excellent dimensional stability and green strength and exhibiting a lack of cracking in both the green and densified states.

To produce casting slips from the high solids content suspensions so prepared, the suspension is generally sonicated or otherwise processed to break down any soft agglomerates which may have formed during the crossflow filtration. Generally, an ultrasonic horn is used for about five minutes and then the slip is deaerated to remove all trapped air bubbles. Deaerating may be done by any suitable means, such as in a dessicator in vacuum. Generally no additional binder or surfactant is added to form the casting slip. In some cases, however, a water-soluble binder such as polyvinyl alcohol, polyethylene glycol, or an acrylic emulsion in an amount of about 0.2-2 wt % is added for additional green strength in the cast component.

The casting slips are then pumped into a porous mold (such as plaster of Paris or any other conventional mold material) and casting is performed under suitable pressures which generally range from about 15 to 100 psi. After completion of the casting, the part is demolded and dried as is conventional.

The distinct differences among castings produced by the use of the sintering aid metal oxide or hydroxide precursor coated nitride particle suspension concentrated to at least about 65 wt % solids by crossflow filtration of this invention as compared to both (i) a coated nitride particle suspension at about 50-55 wt % solids and (ii) a conventional mixture of the nitride particles and sintering aid metal oxide particles is evident from the cast bodies made from casting slips containing the three different compositions as shown in the Examples and Comparative Examples below.

The Examples demonstrate that a suspension of the coated powder, when concentrated by crossflow filtration yield casting slips having a sufficiently high powder loading, both with and without binders, which generate net shape and near net shape cast bodies having high dimensional stability, high green strength, and desirable lack of cracking.

The Comparative Examples demonstrate (i) that concentration techniques not utilizing both shear and pressure assisted filtration could not accomplish the production of sufficiently high powder loadings of the coated particles so as to produce net shape castings without cracking, (ii) that when lower loadings of the coated particles were used they did not produce net shape cast bodies without cracking, and (iii) that the use of a conventional silicon nitride/yttria mixed powder at the same sufficiently high loading as in the Examples so that net shape casting should be possible produced cast bodies having low dimensional stability and exhibiting a high incidence of cracking during drying.

The practice of the invention may be further understood from the following non-limiting Examples in which all parts and percents are by weight unless otherwise specified.

EXAMPLE I

An aqueous suspension of yttrium hydroxide, a precursor to yttrium oxide, coated silicon nitride particles was prepared at a solids content of about 30 wt% by following the procedures taught in the examples of U.S. Pat. Appln. Ser. No. 07/288,208 and 07/450,200, and PCT published application US89/05838. The silicon nitride particles were coated with 4 wt% yttrium hydroxide and the suspension was dried to a powder in which the yttrium hydroxide was converted to yttria.

A 30 wt % aqueous suspension of the yttria coated silicon nitride was prepared and concentrated to about 72 wt % solids by crossflow filtration. Specifically, 28 kg of the yttria coated silicon nitride was dispersed in 65 liters of water at a pH 9 by adding 0.5 wt % ammonium citrate. The resultant slurry was pumped from a holding tank with a diaphragm pump at a pressure of 40-100 psi into a crossflow filtration system utilizing a design of Millipore Corporation (Bedford, Mass.) containing 3 Norton Company (Worcester, Mass.) Ceraflo® 0.22 micron pore size multilumen tubes having a total filtration area of 4.5 ft². The flow rate through the tubes (which is dependent upon the pressure and slip viscosity) was maintained in the range of 10-80 liters per minute. The pressure drop across the filtration membrane was approximately 5 psig. The pressure differential results in the water being filtered through the membrane permeate with a continually increasing solids concentration being left in the slurry (retentate) which is recycled through the holding tank until the desired solids content is produced. The flow rate of filtrate ranged from 0.1 to 2.0 l/min. Pumping and filtration continued in a recirculatory fashion until a solids loading of 72 wt % was achieved. The final slurry had a viscosity of 100-600 centipoise as measured with a Brookfield LV-2 viscometer (spindle #2 at 30 RPM). The slurry was resistant to settling for several days and was easily redispersed even after sitting unagitated for 30 days.

Tensile test rods of net shape components were pressure cast using the above 72 wt % solids suspension by preparing a casting slip therefrom and casting as follows: The concentrated slip, as it came out of the crossflow filtration device, was sonicated for five minutes with a 5 kw horn, deaerated in a dessicator at 20" Hg pressure, and then pressure cast to form 50 conventionally shaped cylindrical tensile test rods (about 6.8" long×diameter varying from about 0.48" to 0.24". No additions were made to the slip. Casting was performed into plaster of Paris molds at 35 psi applied pressure. The slip was fed into the mold cavity from two ends. After the casting was completed (30-40 minutes), the solid cast tensile rods were demolded. Several of them were allowed to dry under ambient conditions. Other bars were dried at 50° C. under 80% relative humidity. Under both drying conditions, no cracking was observed in either the wet or dry state. The cast bars exhibited a theoretical density of 55-60 vol. %.

The rods were successfully densified to full density by hot isostatic pressing. After finish machining the rods were tensile tested at room temperature. Tensile strengths in the range of 600-900 MPa were measured.

EXAMPLE II

The procedure of Example I was repeated except that a water-soluble binder was incorporated into the 72 wt % solids casting slip of Example I. The following binders were tested at the indicated concentrations:

| Binder | Concentration (wt %) |
| --- | --- |
| Acrylic emulsion (BASF Latex AL-609) | 0.5 |
| Polyethylene oxide (M.W. 8,000) | 1 |

No cracking was observed in the tensile test rods in either the wet or dry state when each of the binders was used.

Comparative Example C-1

The starting 4 wt % coated silicon nitride suspension of Example I was concentrated by centrifugation at 2500 rpm to about 50-55% solids loading. It could not be further concentrated since it showed considerable flocculation (gelling). Tensile test rods were cast from the resulting slip by pressure casting as in Example I.

The cast rods measured less than 40% of theoretical density and cracked into numerous pieces after drying.

Comparative Example C-2

In an alternative attempt to increase the solids loading of the initial coated silicon nitride suspension of Example I to above 55 wt %, the suspension was sedimented by allowing it to settle for extended periods (7-14 days). The solids content in the sedimented concentrated slip was lower than centrifuged slip and hence was unsuitable for crack-free net shape casting.

Comparative Example C-3

In an attempt to directly prepare a 70% casting slip of the coated silicon nitride powder, it was dried to convert the yttrium hydroxide coating to yttria and 70 parts of the dried coated powder was directly added to 30 parts water. When the yttria contacted the water, it converted to yttrium hydroxide and an unflowable gel was produced.

Comparative Example C-4

Water soluble binders (as in Example II) were included in the about 50-55% solids casting slip of Comparative Example C-1 in an attempt to produce net shape castings therefrom.

The resulting cast bodies measured less than 40% theoretical density and cracked in numerous pieces after drying, despite the presence therein of the binders.

Comparative Example C-5

A conventional alcohol milled powder mixture was produced by milling silicon nitride and 4% yttria in isopropanol for about twenty-four hours. The mixture was dried, redispersed in water at a 70 wt % solids loading containing 1 wt % dispersant (Colloid 111M) and formed into a casting slip as in Example I. The resulting slip was used to pressure cast tensile test rods at 30-60 psi.

The resulting cast bodies had approximately 60% theoretical density. The cast bodies invariably immediately cracked on removal from the mold.

Comparative Example C-6

The procedure of Comparative Example C-5 was repeated except that the following water soluble binder systems were included in the suspension at conventional binder amounts of 0.5 to 1%: polyethylene glycol (PEG) at 8000 molecular weight, polyvinyl acetate at 86,000 molecular weight, and acrylic emulsions at 110,000 molecular weight.

The resulting cast bodies exhibited essentially the same unfavorable properties as those of Comparative Example C-5, i.e. low theoretical density and cracking.

What is claimed is:

1. A process for preparing an aqueous suspension of ceramic particles at a solids loading greater than about 65 wt%, wherein the particles have a surface coating of a metal compound selected from metal hydroxides and metal oxides, wherein the process comprises subjecting an aqueous suspension of said coated ceramic particles having a solids content of less than about 50 wt % to crossflow filtration until the solids loading is greater than about 65 wt %.

2. The process of claim 1, wherein the solids loading is greater than about 70 wt %.

3. The process of claim 1, wherein the ceramic particles comprise an inorganic nitride.

4. The process of claim 3, wherein the ceramic particles comprises an inorganic nitride selected from the group consisting of silicon nitride, aluminum nitride, boron nitride, and titanium nitride.

5. The process of claim 3, wherein the ceramic particles comprise silicon nitride.

6. The process of claim 1, wherein the surface coating is substantially uniform.

7. The process of claim 1, wherein the surface coating is a sintering aid or precursor thereto for the ceramic particles.

8. The process of claim 7, wherein the sintering aid or precursor is an oxide or hydroxide of a metal selected from the group consisting essentially of yttrium, magnesium, zirconium, aluminum, cerium, hafnium, and mixtures thereof.

9. The process of claim 7, wherein the sintering aid or precursor is an oxide or hydroxide of a metal selected from the group consisting essentially of yttrium, magnesium, and mixtures thereof.

10. The process of claim 7, wherein the sintering aid comprises a compound selected from the group consisting of yttria and yttrium hydroxide.

11. The process of claim 1, wherein the coated particles comprise silicon nitride coated with yttrium hydroxide.

12. A flowable aqueous composition of coated ceramic particles as a solids content of greater than about 65 wt% wherein the ceramic particles are coated with a substantially uniform surface coating of a metal compound selected from the group consisting of metal hydroxides and metal oxides.

13. The composition of claim 12, wherein the ceramic particles comprise an inorganic nitride.

14. The composition of claim 13, wherein the nitride is selected from the group consisting of silicon nitride, aluminum nitride, boron nitride, and titanium nitride.

15. The composition of claim 13, wherein the nitride comprises silicon nitride.

16. The composition of claim 12, wherein the metal compound is selected from the group consisting of a sintering aid for ceramic particles and a precursor to a sintering aid for ceramic particles.

17. The composition of claim 16, wherein the sintering aid or precursor is an oxide or hydroxide of a metal selected from the group consisting essentially of yttrium, magnesium, zirconium, aluminum, cerium, hafnium, and mixtures thereof.

18. The composition of claim 16, wherein the sintering aid comprises a compound selected from the group consisting of yttria and yttrium hydroxide.

19. The composition of claim 12 wherein the ceramic particles comprise silicon nitride coated with yttrium hydroxide.

* * * * *